United States Patent
Nakamoto et al.

(10) Patent No.: US 11,465,853 B2
(45) Date of Patent: Oct. 11, 2022

(54) BAG TRANSFER APPARATUS

(71) Applicant: PACRAFT Co., Ltd., Tokyo (JP)

(72) Inventors: Kakue Nakamoto, Yamaguchi-ken (JP); Tohru Yoshikane, Yamaguchi-ken (JP)

(73) Assignee: PACROFT CO., LTD., Tokyo (JP)

( * ) Notice: Subject to any disclaimer, the term of this patent is extended or adjusted under 35 U.S.C. 154(b) by 0 days.

(21) Appl. No.: 17/233,092

(22) Filed: Apr. 16, 2021

(65) Prior Publication Data

US 2021/0331870 A1 Oct. 28, 2021

(30) Foreign Application Priority Data

Apr. 24, 2020 (JP) .............................. JP2020-077508

(51) Int. Cl.
*B65B 43/46* (2006.01)
*B65G 17/20* (2006.01)
*B65B 3/04* (2006.01)

(52) U.S. Cl.
CPC ................ *B65G 17/20* (2013.01); *B65B 3/04* (2013.01); *B65B 43/46* (2013.01); *B65G 2201/0238* (2013.01)

(58) Field of Classification Search
CPC ............ B65G 17/10; B65B 3/04; B65B 46/46
USPC ............................................. 198/678.1, 715
See application file for complete search history.

(56) References Cited

U.S. PATENT DOCUMENTS

| | | | |
|---|---|---|---|
| 8,261,785 B2 * | 9/2012 | Koga | B65B 43/465 |
| | | | 141/10 |
| 9,096,333 B2 * | 8/2015 | Honda | B65B 43/50 |
| 9,150,315 B2 * | 10/2015 | Vollenkemper | B65B 43/30 |
| 9,221,569 B2 * | 12/2015 | Nakamoto | B65B 43/50 |
| 9,505,504 B2 * | 11/2016 | Murray | B65B 43/465 |
| 9,987,754 B2 * | 6/2018 | Yoshikane | B65B 59/005 |
| 9,994,345 B2 * | 6/2018 | Fu | B65B 43/16 |
| 10,676,224 B2 * | 6/2020 | Nakamoto | B65C 1/02 |
| 11,117,698 B2 * | 9/2021 | Matsumura | B65B 43/44 |
| 2012/0210675 A1 | 8/2012 | Murray et al. | |

FOREIGN PATENT DOCUMENTS

| | | | |
|---|---|---|---|
| EP | 3315424 | * | 2/2018 |
| EP | 3901070 | * | 10/2021 |
| JP | 2002-302227 A | | 10/2002 |
| JP | 2011-240962 A | | 12/2011 |

(Continued)

OTHER PUBLICATIONS

US 2007/0204570 A1, Okazaki, Sep. 6 (Year: 2007).*

(Continued)

*Primary Examiner* — Douglas A Hess
(74) *Attorney, Agent, or Firm* — Pillsbury Winthrop Shaw Pittman, LLP

(57) ABSTRACT

A bag transfer apparatus includes a plurality of holding units which include a first holding unit and a second holding unit provided to be adjacent to each other in a horizontal direction and are provided to be able to move, wherein each of the plurality of holding units includes: a left support unit which supports one side portion of a bag; and a right support unit which supports another side portion of the bag, and wherein one of the right support unit of the first holding unit and the left support unit of the second holding unit is positioned above the other.

8 Claims, 23 Drawing Sheets

(56) References Cited

FOREIGN PATENT DOCUMENTS

| | | |
|---|---|---|
| JP | 2018-095322 A | 6/2018 |
| KR | 101253510 B1 | 4/2013 |
| WO | 2019/161979 A1 | 8/2019 |

OTHER PUBLICATIONS

Extended European Search Report dated Sep. 14, 2021, issued in corresponding European Patent Application No. 21168868.4 (51 pages), including computer generated translations of JP 2018-095322 and KR 101253510.

* cited by examiner

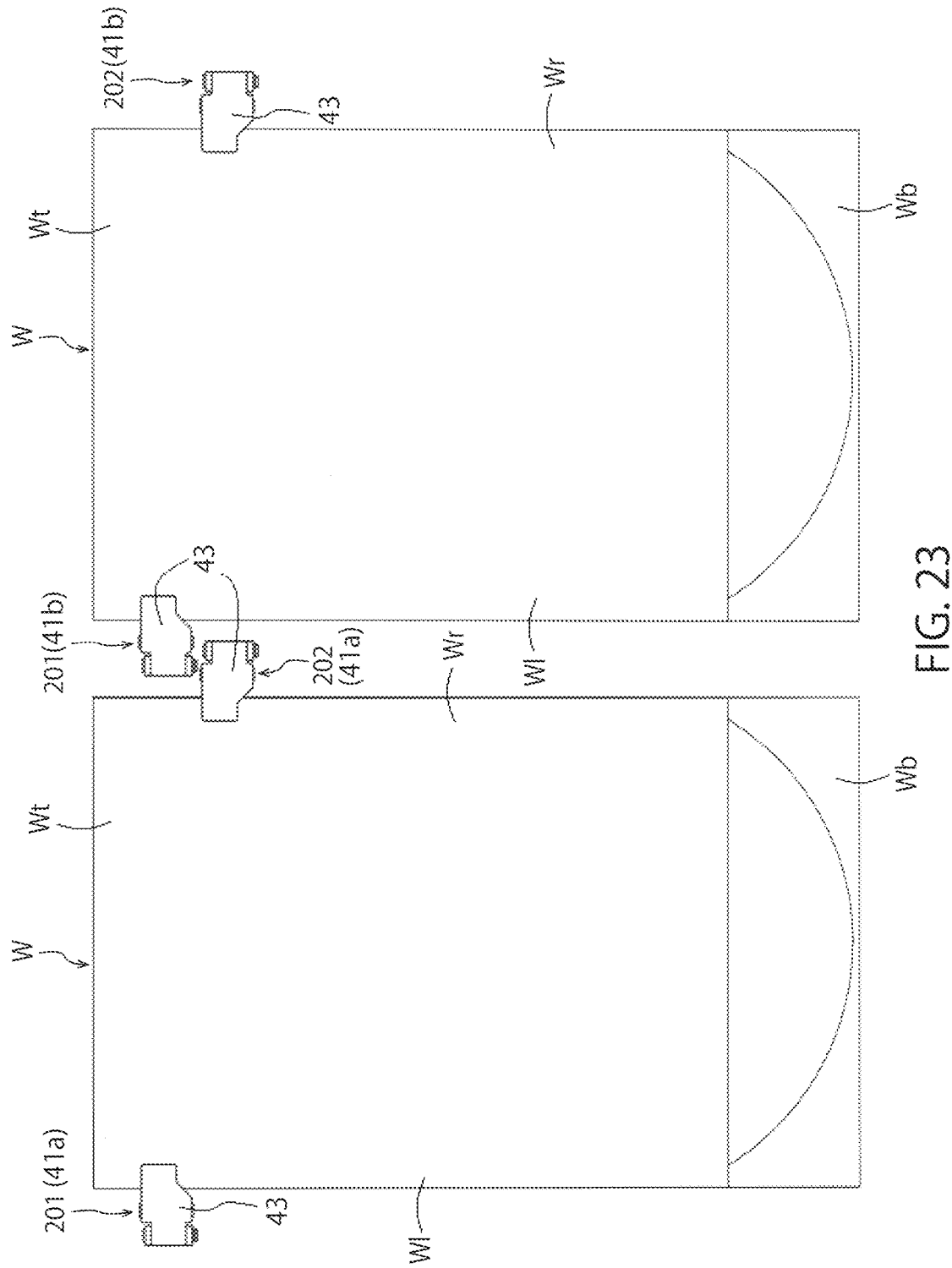

BAG TRANSFER APPARATUS

CROSS-REFERENCE TO RELATED APPLICATIONS

This application is based upon and claims the benefit of priority from Japanese Patent Application No. 2020-077508, filed on Apr. 24, 2020; the entire contents of which are incorporated herein by reference.

TECHNICAL FIELD

The present disclosure is directed to a bag transfer apparatus.

BACKGROUND ART

In apparatuses such as bag packaging machines, while a large number of bags are being transferred, various processes, such as opening the bags, putting contents into the bags and sealing the mouths of the bags, are performed.

For example, in the packaging machines disclosed in Japanese patent application publication Nos. 2002-302227 and 2011-240962, a bag is transferred along an annular path while both side edges of the bag are held by a pair of grippers, and various packaging processes are sequentially performed.

SUMMARY OF INVENTION

Technical Problem

In recent years, a wide variety of bags have been developed and are actually used. For example, bags of various sizes are used according to the required characteristics of the contents. In addition, the planar shape of bags also becomes diversified. While bags having a symmetrical planar shape such as a quadrangle are typically used, many bags having an asymmetric planar shape have also been recently used (see, for example, FIG. 2(c) of Japanese patent application publication No. 2011-240962).

Therefore, there is a demand for a bag transfer apparatus capable of appropriately supporting and transferring bags of various shapes. There is also a demand for miniaturization of the entire bag transfer apparatus and more efficient transfer of bags.

The present disclosure has been contrived in view of the above circumstances, and an object of the present disclosure is to provide a technique capable of appropriately supporting and transporting bags of various shapes. Another object is to provide a technique that enables the miniaturization of an apparatus and the efficient transfer of a bag.

Solution to Problem

One aspect of the present disclosure is directed to a bag transfer apparatus comprising a plurality of holding units which include a first holding unit and a second holding unit provided to be adjacent to each other in a horizontal direction and are provided to be able to move, wherein each of the plurality of holding units includes: a left support unit which supports one side portion of a bag; and a right support unit which supports another side portion of the bag, and wherein one of the right support unit of the first holding unit and the left support unit of the second holding unit is positioned above the other.

Whole of the one of the right support unit of the first holding unit and the left support unit of the second holding unit may be positioned above whole of the other.

In each of the first holding unit and the second holding unit, one of the left support unit and the right support unit may be positioned above the other.

The right support unit of the first holding unit and the left support unit of the second holding unit may overlap each other in a height direction.

The left support unit may pinch the one side portion of the bag to support the one side portion and the right support unit may pinch the another side portion of the bag to support the another side portion.

According to the present disclosure, it is possible to transfer bags of various shapes while appropriately supporting the bags. Further, according to the present disclosure, the miniaturization of an apparatus and the efficient transfer of a bag are possible.

BRIEF DESCRIPTION OF DRAWINGS

FIG. 23 is a view which shows a variant example of a gripper pair and in which a first gripper pair and a second gripper pair adjacent to each other are viewed in a horizontal direction (i.e., a front view).

DESCRIPTION OF EMBODIMENTS

Hereinafter, an example of a bag transfer apparatus 500 of a bag packaging machine will be described with reference to the drawings.

Figure 1A:
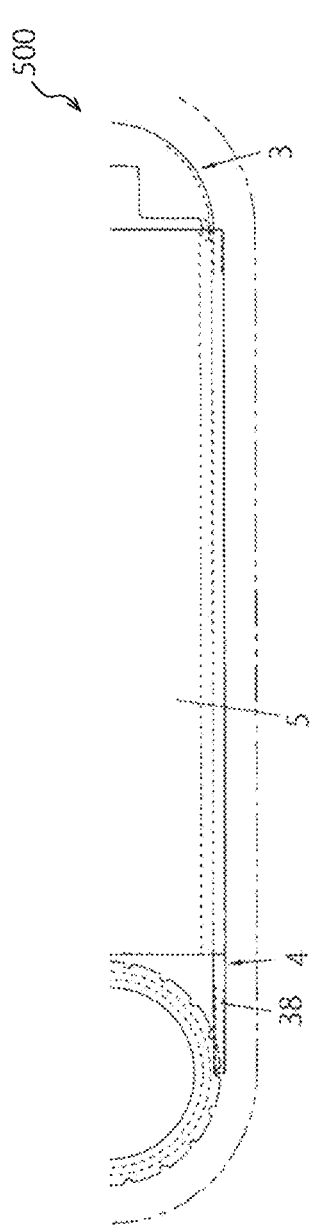
FIG. 1A is a plan view of a sprocket, a fixed guide member and a linear guide member of a bag transfer apparatus.
Figure 1B:
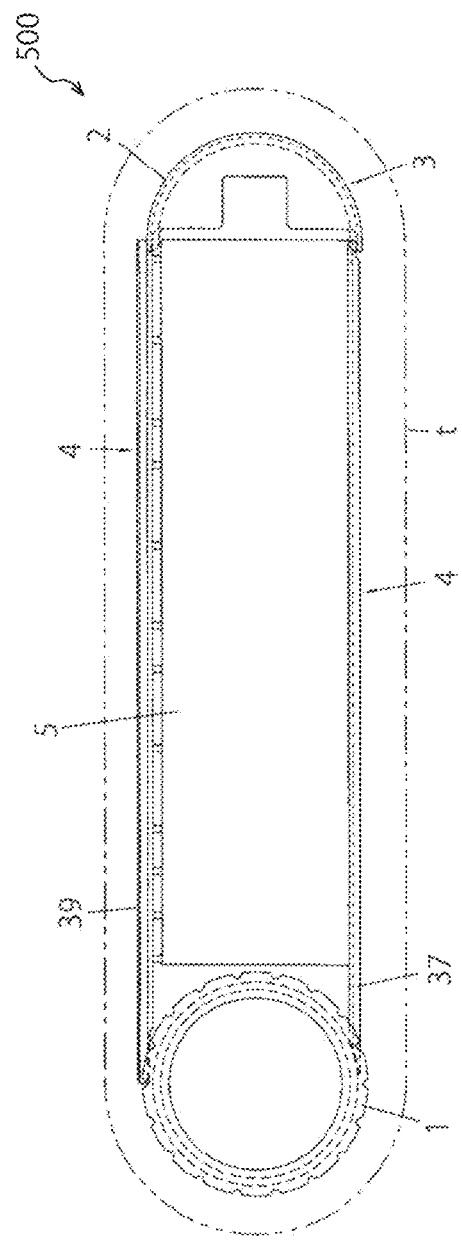
FIG. 1B is a plane section view of the sprocket, the fixed guide member and the linear guide member of the bag transfer apparatus.
Figure 1C:
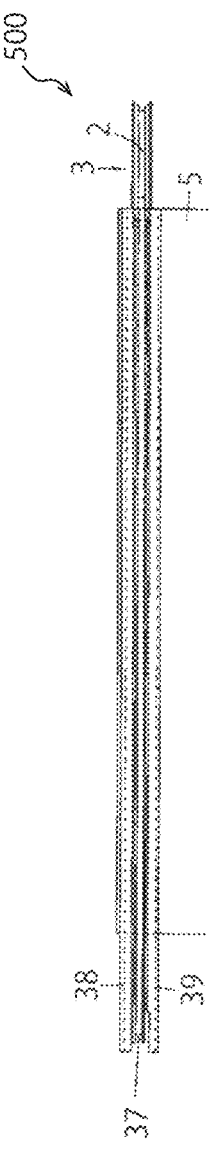
FIG. 1C is a front view of the sprocket, the fixed guide member and the linear guide member of the bag transfer apparatus.

The bag transfer apparatus 500 shown in FIGS. 1A to 1C comprises: a sprocket 1 which is connected to a driving device (i.e., a driving means) and continuously rotates in a horizontal plane; a fixed guide member 3 which is arranged in the same horizontal plane and has a guide unit 2 having a substantially semicircular shape in a plan view; an endless chain (not shown) which is supported by and extends between the sprocket 1 and the guide unit 2; and straight guide members 4 that guide the endless chain in straight tracks between the sprocket 1 and the guide unit 2.

The endless chain is provided with a plurality of gripper pairs which grip both edges (both lateral parts) of bags and are provided at equal intervals, and conveys the bags at a constant speed along a transfer track t. A sub-machine base 5 is arranged inside the track of the endless chain, and the fixed guide member 3, the straight guide members 4, and various packaging processing devices are installed on the side of and above the sub-machine base 5.

Figure 7:
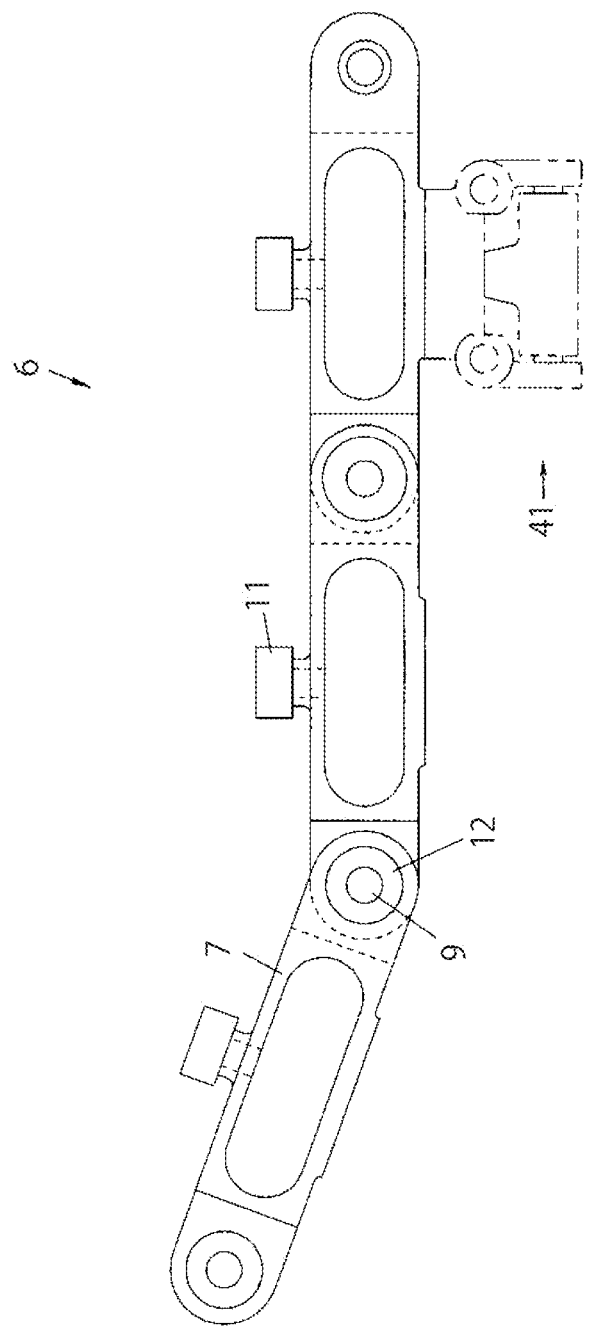
FIG. 7 is a plan view of an endless chain.
Figure 8:
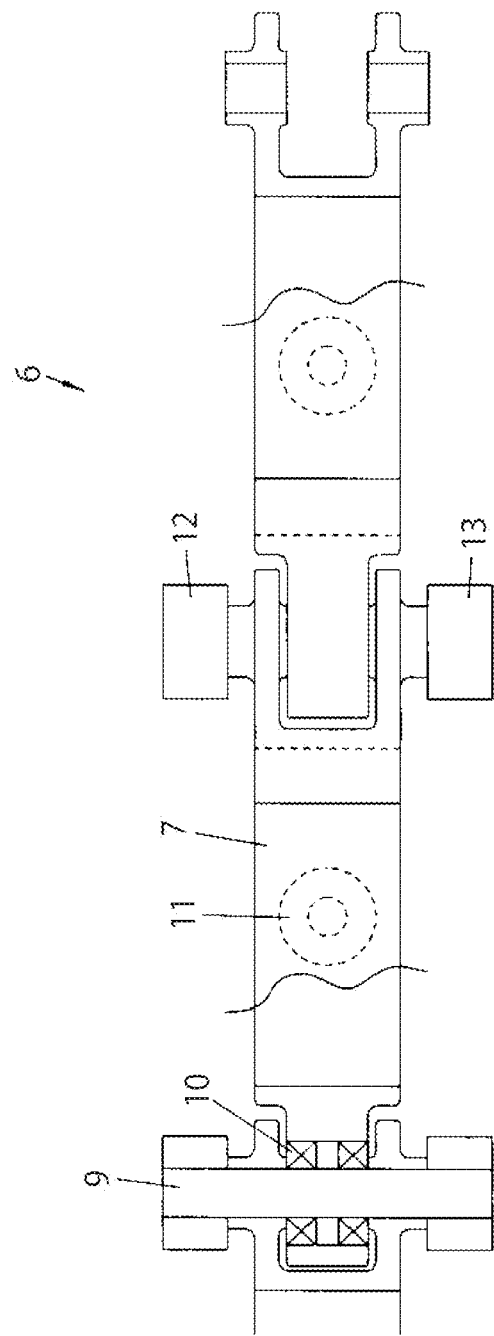
FIG. 8 is a front view (a partial cross section) of an endless chain.

As shown in FIGS. 7 and 8, the endless chain 6 is formed by connecting a plurality of links 7 via connecting shafts 9 in an endless manner. A connecting shaft 9 is fixed to one end of one link 7 and supported by another end of an adjacent link 7 via a bearing 10 so as to be able to rotate freely, and each of all the links 7 is provided with one pair of grippers. An inner guide roller 11 is rotatably installed at the inner central portion of each link 7 so as to be able to rotate freely in a vertical plane. An upper guide roller 12 and a lower guide roller 13 are installed above and below each connecting shaft 9 so as to be able to rotate freely in horizontal planes.

Figure 2:
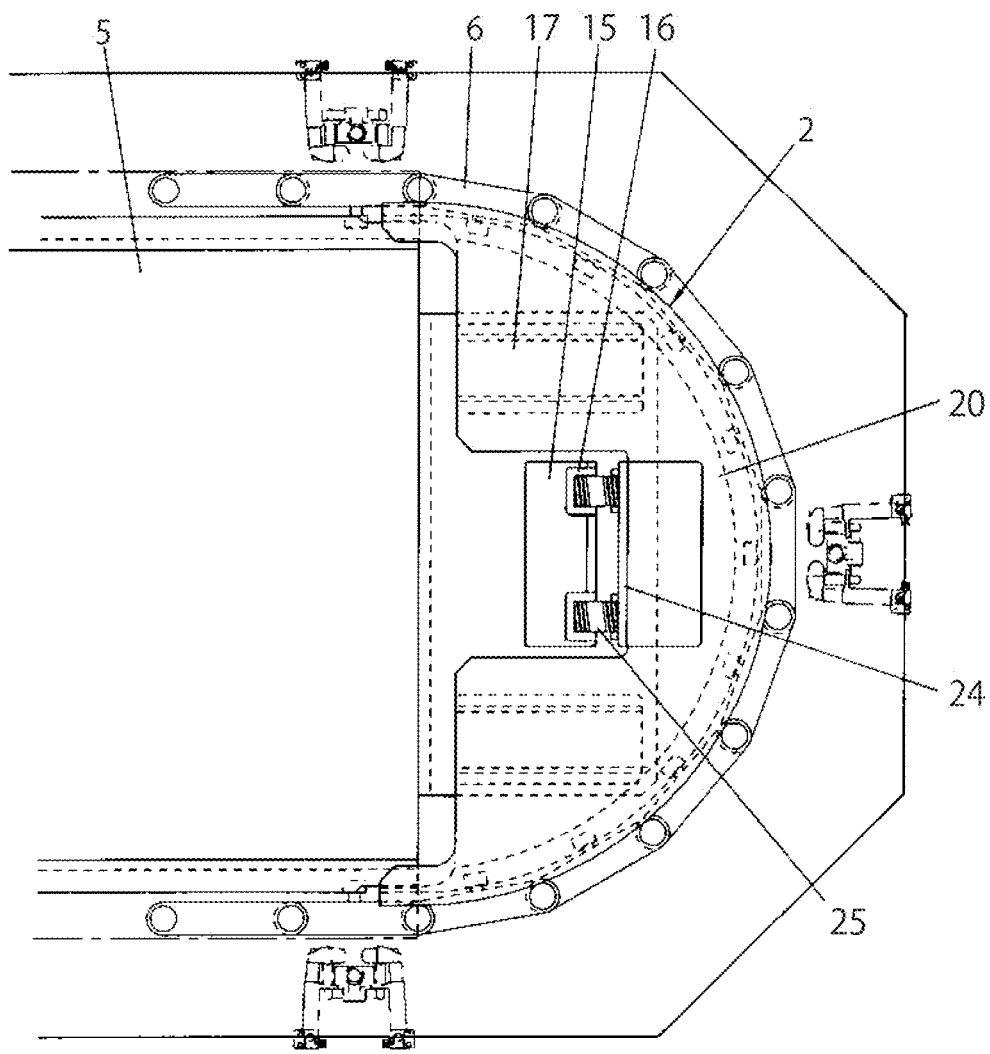
FIG. 2 is a plan view of a fixed guide member.
Figure 3:
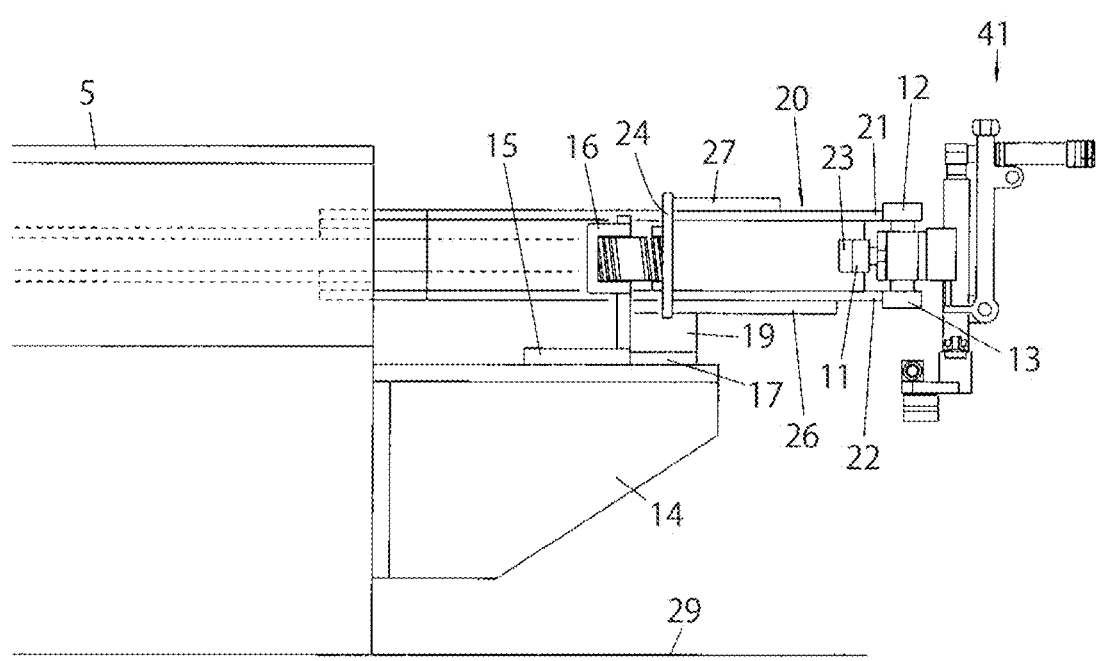
FIG. 3 is a front sectional view of a fixed guide member.
Figure 4:
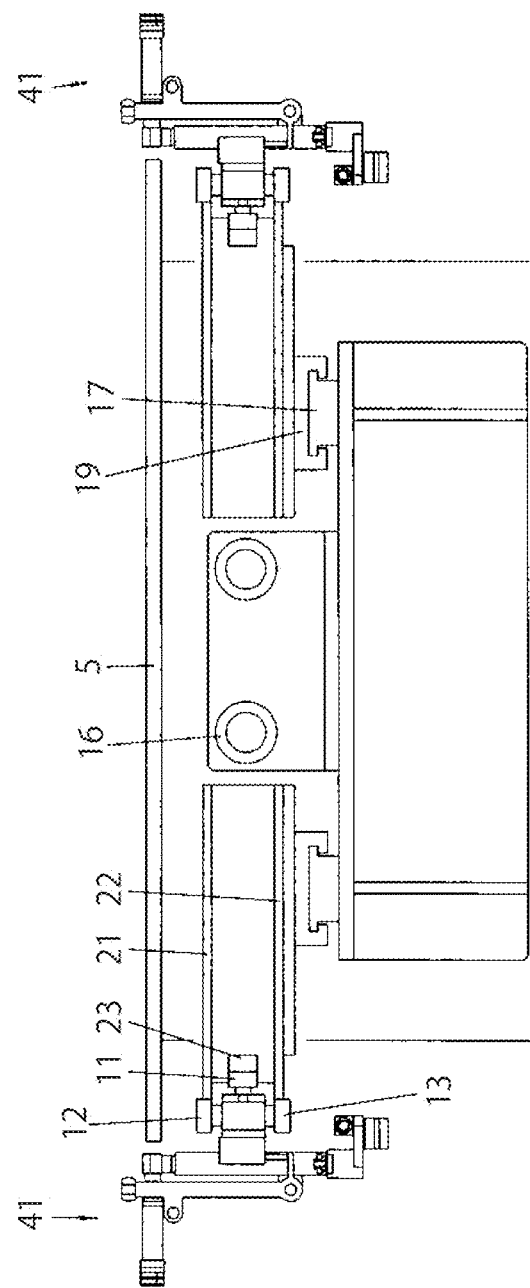
FIG. 4 is a side sectional view of a fixed guide member.

As shown in FIGS. 2 to 4, the fixed guide member 3 is installed on a bracket 14 provided at an end part of the sub-machine base 5 and includes: spring support members 16 fixed onto the bracket 14 via a mounting portion 15; a pair of slide rails 17 fixed onto the bracket 14; slide members 19 slidably provided on the slide rails 17, and a guide plate 20 fixed onto the slide members 19, and the like. A guide unit 2 is formed on the outer lateral circumference of a substantially semicircular side surface of the guide plate 20. The guide unit 2 includes: an upper roller guide portion 21 and a lower roller guide portion 22 which have a flange shape and abut on the upper guide rollers 12 and the lower guide rollers 13 of the endless chain 6, respectively; and a guide groove 23 which is arranged between the upper roller guide portion 21 and the lower roller guide portion 22 and into which the inner guide rollers 11 are fitted. A spring receiving member 24 is fixed to an inner recess of the guide plate 20, and compression springs 25 are arranged between the spring receiving member 24 and the spring support members 16 so as to always urge the guide plate 20 outward. The reference numeral of "26" denotes a mounting plate which mounts the guide plate 20 to the slide members 19, the reference numeral of "27" denotes a mounting plate which mounts the spring receiving member 24 to the guide plate 20, and the reference numeral of "29" denotes a machine base.

Figure 5:
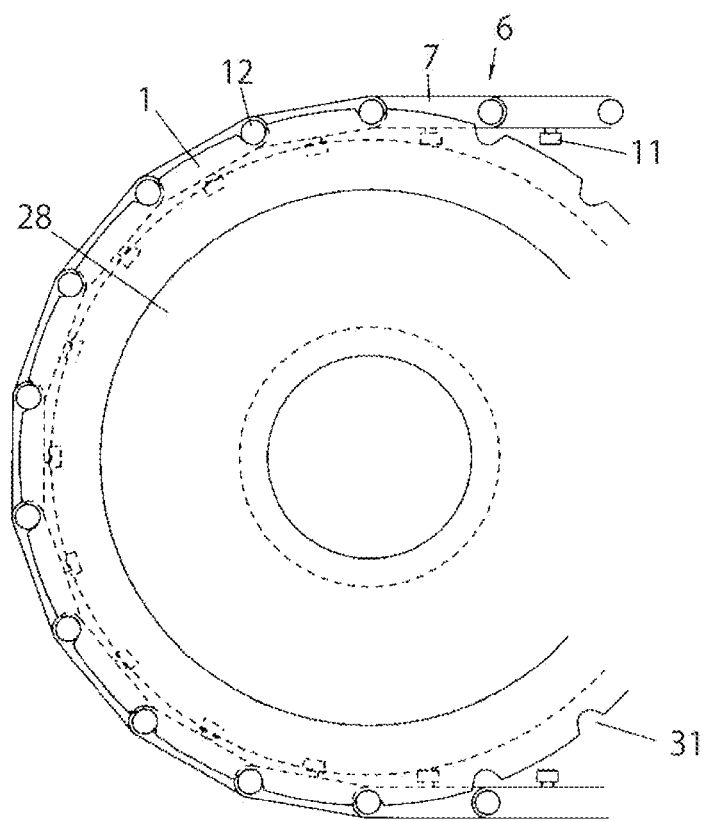
FIG. 5 is a plan view of a sprocket.
Figure 6:
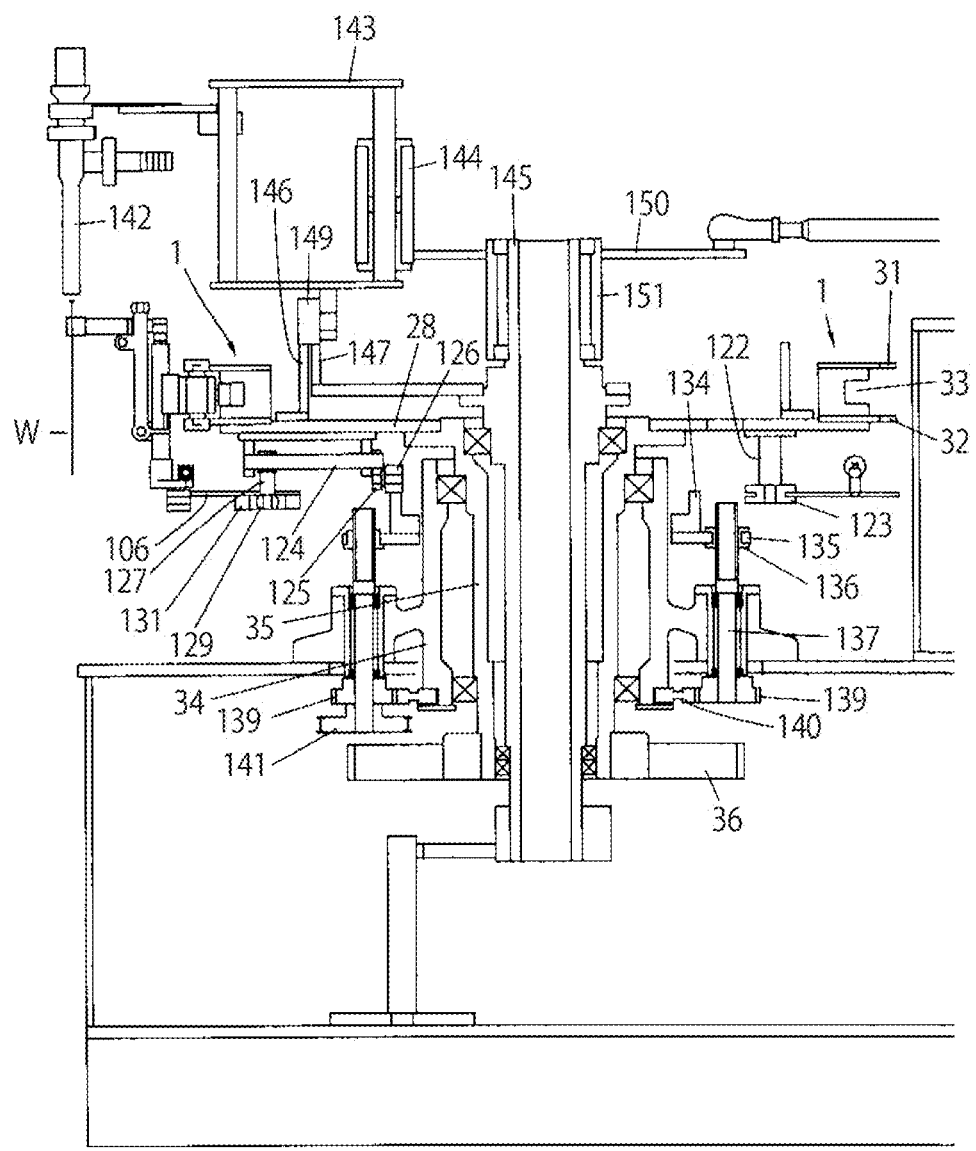
FIG. 6 is a front sectional view of a sprocket and its surroundings.
Figure 10:
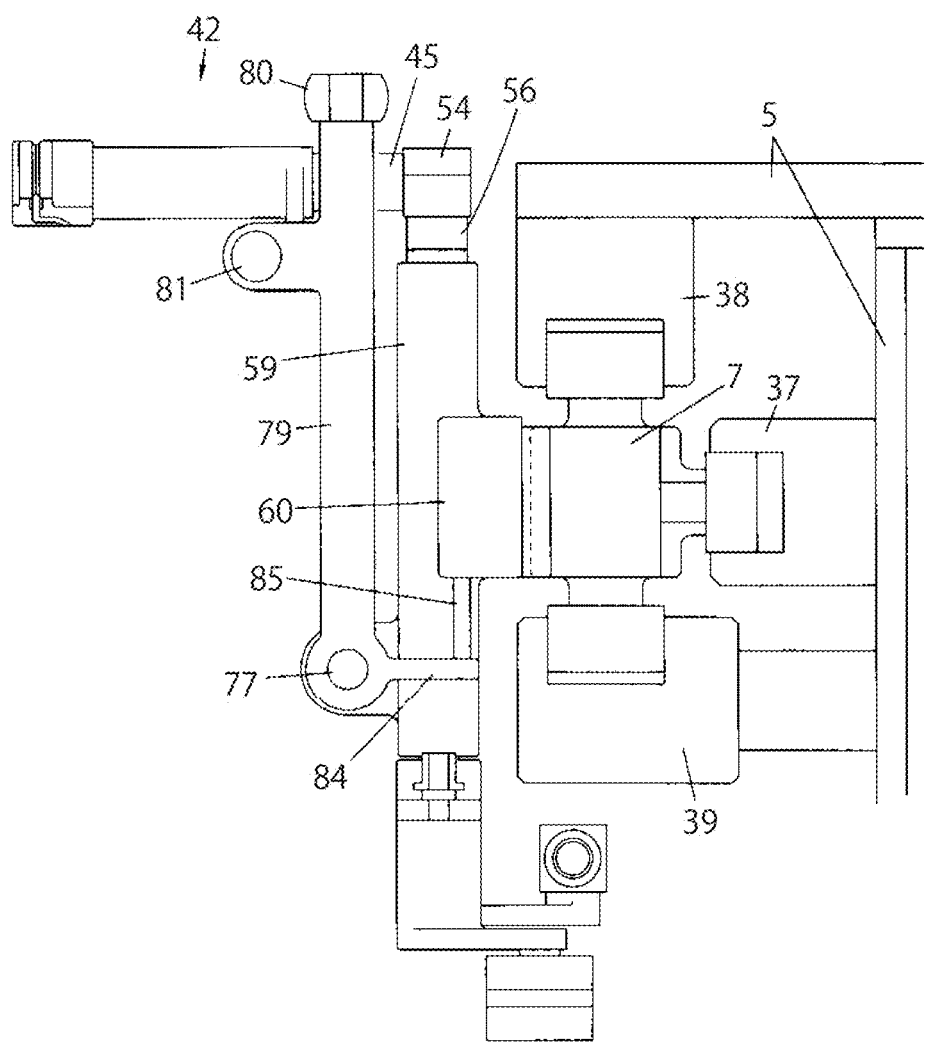
FIG. 10 is a side view (a partial cross section) of a pair of grippers.

As shown in FIGS. 5 and 6, the sprocket 1 is fixed to the circumstance of a sprocket mounting plate 28, has recess portions 31 and 32 at equal intervals, and has an annular support groove 33 into which the inner guide rollers 11 are fitted. The upper guide roller 12 and the lower guide roller 13 are fitted to the outer peripheral surfaces of the recess portions 31 and 32, respectively. The sprocket mounting plate 28 is fixed to a second hollow shaft 35 which is supported so as to rotate freely inside a stand 34 erected on the machine base 29, and a gear 36 for a rotation driving connected to a drive source (not shown) is fixed to the lower end of the second hollow shaft 35. As shown in FIGS. 1 and 10, the straight guide members 4 each have an inner guide rail 37, an upper guide rail 38, and a lower guide rail 39. The inner guide rail 37, the upper guide rail 38 and the lower guide rail 39 are attached to the sub-machine base 5 and respectively have guide grooves into which the guide rollers 11 to 13 are fitted.

When the gear 36 rotates, the sprocket 1 rotates and the endless chain 6 rotates together. In response to the rotation of the sprocket 1, inner guide rollers 11 are fitted into the support groove 33, upper guide rollers 12 and lower guide rollers 13 are fitted into recesses 31 and 32, and each link 7 included in the endless chain 6 rotates while being positioned around the sprocket 1. Guide rollers 11 to 13 that have exited the sprocket 1 travel while being fitted into the guide rails 37 to 39 in a straight line part, and then enter the arc-shaped guide unit 2. In the guide unit 2, inner guide rollers 11 travel while fitting into the guide groove 23, and the upper guide rollers 12 and the lower guide rollers 13 travel on the upper and lower roller guide portions 21 and 22. Since the fixed guide member 3 is urged outward by the compression springs 25, upper guide rollers 12 and lower guide rollers 13 are always in close contact with the roller guide portions 21 and 22. Guide rollers 11 to 13 which have exited the guide unit 2 enter another straight line part, and are fitted into the guide rails 37 to 39 and travel toward the sprocket 1 in a similar manner.

As described above, the guide rollers 11 to 13 are reliably guided by the recesses 31 and 32 of the sprocket 1, the support groove 33, the guide unit 2 and the straight guide members 4 during traveling; therefore, the vertical position and the horizontal position of the moving links 7 are stable, and even if the weight of filled bags or the impact at the time of filling are transmitted to the links 7 through the grippers, the links 7 can withstand the weight and the impact and accurately transfer the grippers (and eventually, the bags) along the transfer track t. Since each link 7 has a considerable linear length, when the endless chain 6 rotates, the distance between the centers of the endless chain 6 (that is, the distance between the center of the sprocket 1 and the center of the arc of the guide unit 2) varies while the endless chain 6 travels by one pitch (i.e., the length of a link 7), and this variation in the distance is absorbed by the compression springs 25.

Figure 9:
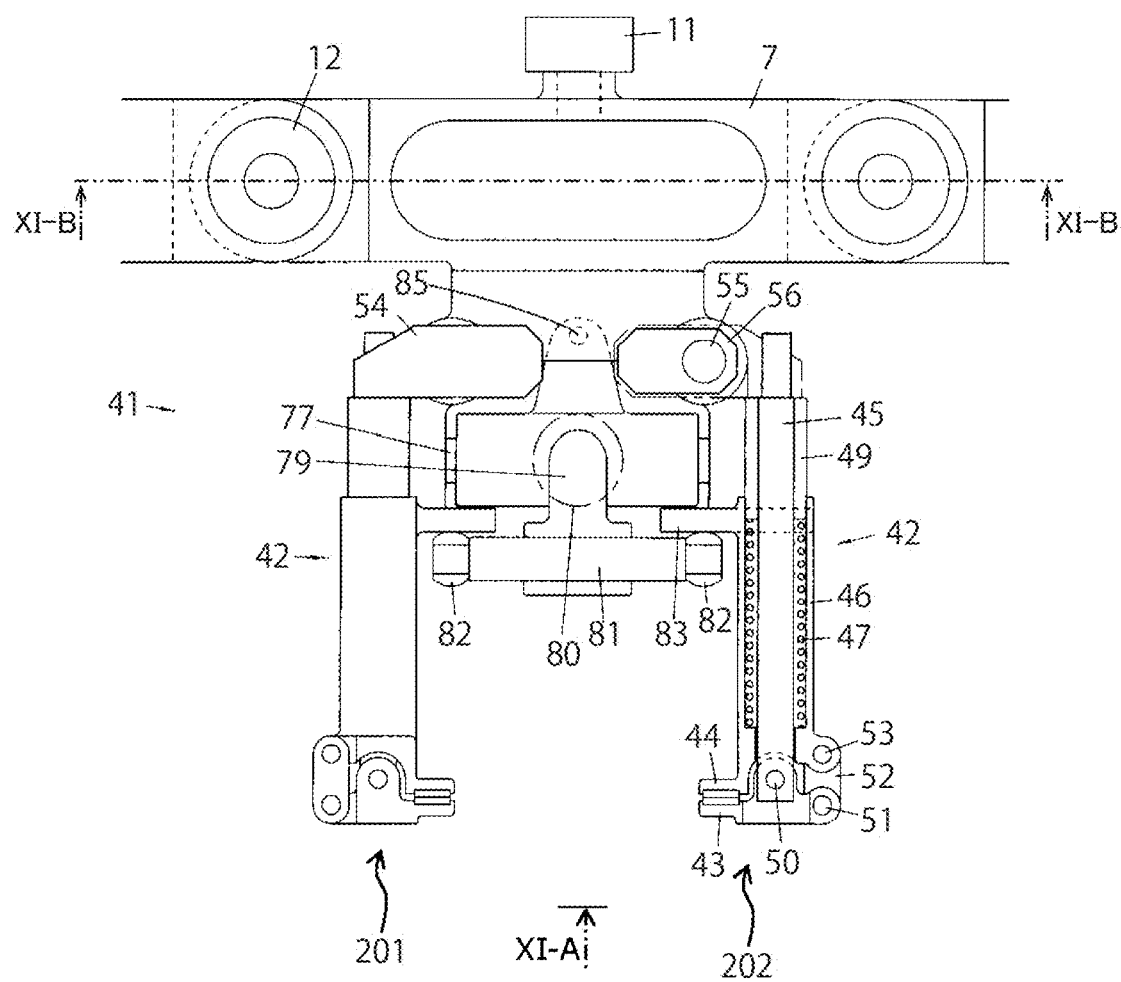
FIG. 9 is a plan view (a partial cross section) of a pair of grippers.
Figure 11:
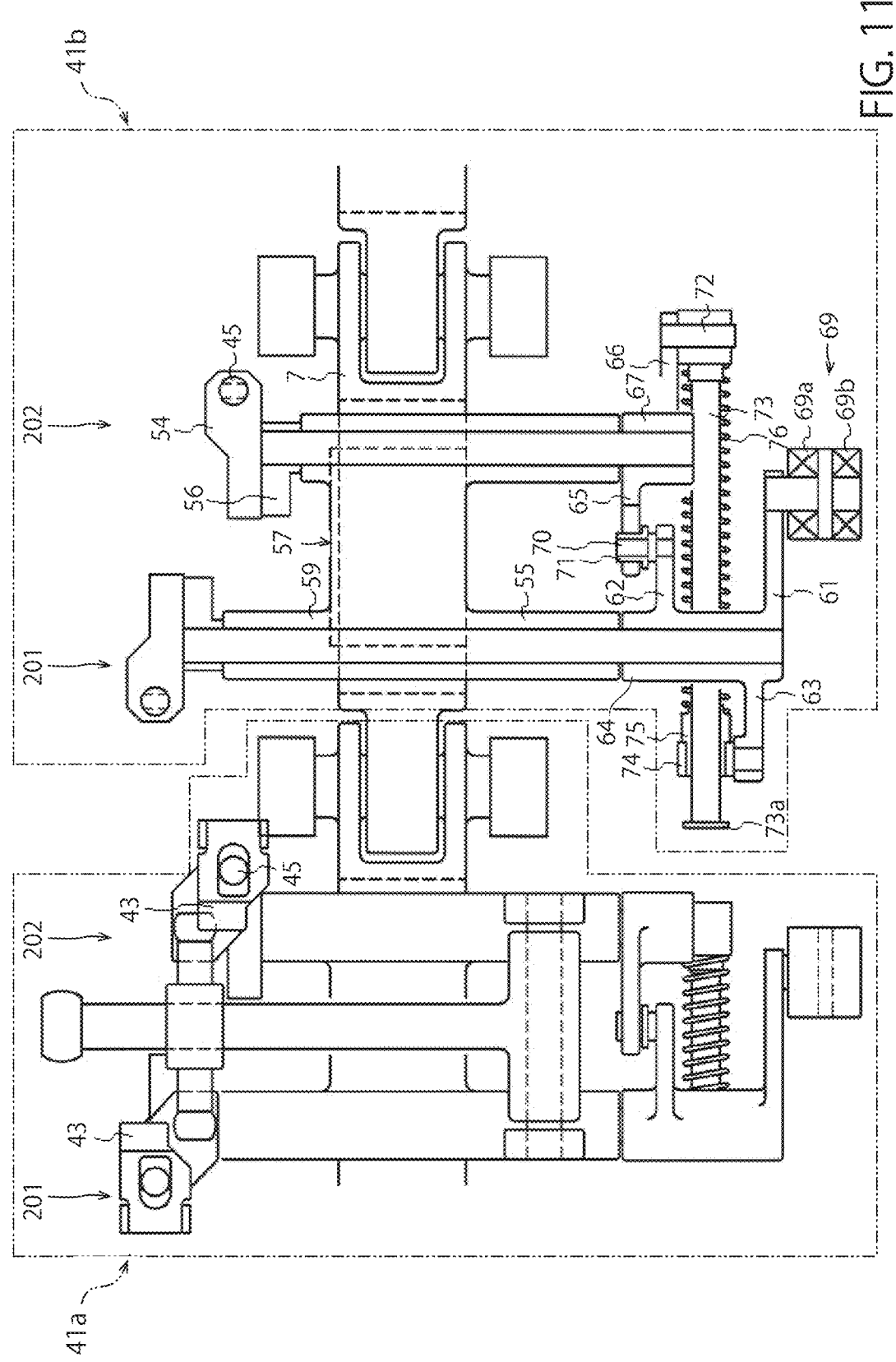
FIG. 11 is a front view (a partial cross section) of a pair of grippers.
Figure 12:
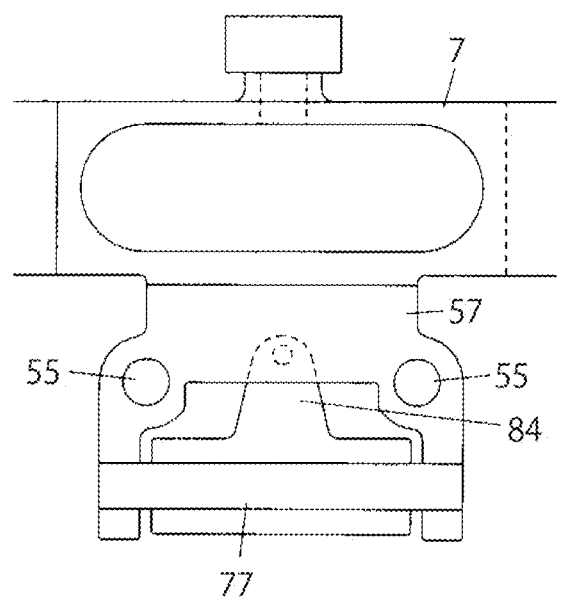
FIG. 12 is a plane section view of a pair of grippers.
Figure 13:
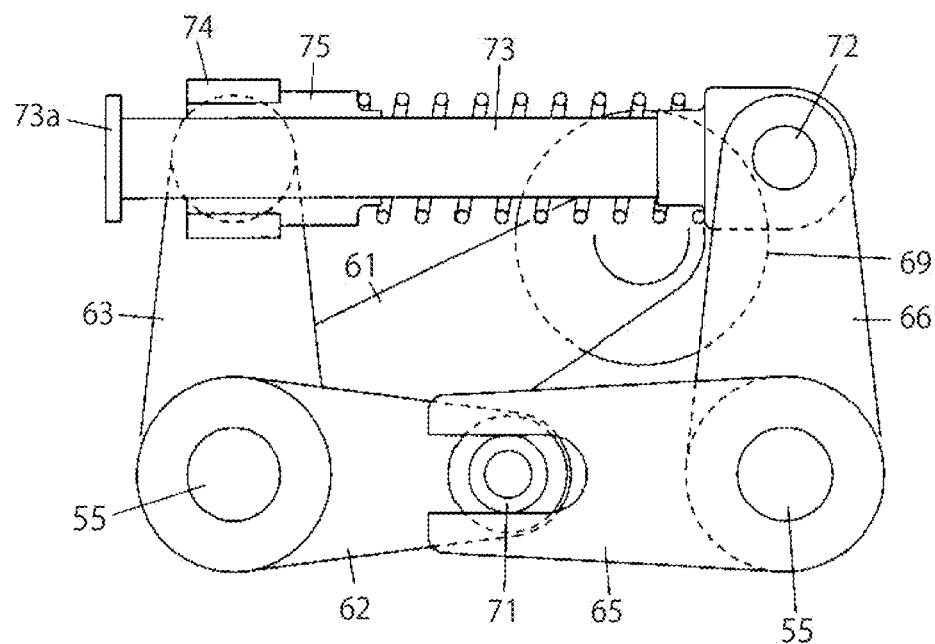
FIG. 13 is a plane section view of an opening-closing mechanism unit for an arm.

A gripper pair 41 (a holding unit) shown in FIGS. 9 to 13 is attached to an outer side surface of each link 7. In FIG. 11, the range surrounded by the alternate long and two short dashes line denoted by the reference numeral of "41a" shows an example of the state of a gripper pair 41 (in particular, a first gripper pair 41a) based on the arrow of the reference numeral of "XI-A" in FIG. 9. In FIG. 11, the range surrounded by the alternate long and two short dashes line denoted by the reference numeral of "41b" shows an example of the state of a gripper pair 41 (in particular, a second gripper pair 41b) along the cross-sectional line of the reference numeral of "XI-B" in FIG. 9. In FIG. 9, for convenience, the reference numerals of "XI-A" and "XI-B" are attached to one gripper pair 41. In FIG. 11, the first gripper pair 41a (i.e., the first holding unit) and the second gripper pair 41b (i.e., the second holding unit) provided so as to be adjacent to each other in the horizontal direction are shown in states corresponding to the reference numerals of "XI-A" and "XI-B" respectively.

The gripper pairs 41 are provided so as to be movable in the horizontal direction together with the endless chain 6, and each comprise arms 42, 42 which form a pair, extend horizontally outward, and open and close leftward and rightward at predetermined timings. Gripping members 43, 44 that can open and close are attached to each of the tips of the arms 42 forming a pair. Each arm 42 includes: a fixed shaft 45; a sliding cylinder 46 that fits around the fixed shaft 45; a compression spring 47 that urges the sliding cylinder 46 forward (i.e., in the direction of closing the gripping members 43, 44); and a spring receiving seat 49 fitted into the fixed shaft 45. The intermediate portion of the outer gripping member 43 is pivotally supported at the tip of the fixed shaft 45 by means of a pin 50 so as to horizontally rotate in a free manner. The rear end of the outer gripping member 43 is pivotally supported at the outer tip of the sliding cylinder 46 via a connecting pin 51, a link 52, and a connecting pin 53 so as to horizontally rotate in a free manner. Accordingly, when the sliding cylinder 46 retracts against the urging force of the compression spring 47, the gripping members 43 and 44 are greatly opened. The rear end of the fixed shaft 45 is fixed to a mounting block 54, and the mounting block 54 is fixed to the upper surface of a mounting block 56 fixed to the tip of a swing fulcrum shaft 55 extending vertically. Accordingly, when the swing fulcrum shaft 55 rotates about the axis, the pair of arms 42, 42 swings to the left and right (i.e., opens and closes) together with the mounting blocks 54, 56.

In drawings other than FIG. 11, the height direction position of a gripper pair 41 is shown in a simplified manner, and the relative relation between the height direction positions of the left support unit 201 and the right support unit 202 is not necessarily shown in an accurate manner. As will be described later, in the present embodiment, one of the right support unit 202 of the first gripper pair 41a and the left support unit 201 of the second gripper pair 41b is positioned above the other, and in an example shown in FIG. 11, the left support unit 201 of the second gripper pair 41b is positioned above the right support unit 202 of the first gripper pair 41a. The plurality of gripper pairs 41 included in the bag transfer apparatus 500 shown in drawings have a common configuration with each other, and the first gripper pair 41a and the second gripper pair 41b shown in FIG. 11 naturally have a common configuration with each other.

The swing fulcrum shaft 55 is rotatably supported inside a tubular member 59 of a holder 57, and the holder 57 is fixed to the outer surface of a link 7 at a mounting portion 60. A tubular member 64 to which three levers 61 to 63 are attached is fixed to the lower end of one swing fulcrum shaft 55, and a tubular member 67 to which two levers 65, 66 are attached is fixed to the lower end of the other swing fulcrum shaft 55. Two upper and lower cam rollers 69 are rotatably supported at the tip of the lever 61, and the cam rollers 69 travel along an interval adjustment cam described later to rotate one of the swing fulcrum shafts 55. Further, a bush 71 is rotatably attached to the tip of the lever 62 via a support pin 70, and the bush 71 fits into a groove-shaped notch of the lever 65, whereby the other swinging fulcrum shaft 55 also simultaneously rotates in the opposite direction. Further, a connecting shaft 73 is attached to a support pin 72 at the tip of the lever 66 so as to be able to horizontally rotate in a free manner. A bush 75 is horizontally fixed to a holder pin 74 which is rotatably attached to the tip of the lever 63. The connecting shaft 73 is slidably fitted in the bush 75, and a compression spring 76 is installed around the connecting shaft 73. This compression spring 76 presses the cam roller 69 against the interval adjustment cam. The reference numeral of "73a" denotes a stopper.

A fulcrum shaft 77 is rotatably supported on the outermost part of the holder 57, and the lower end of an opening-closing lever 79 is fixed to the fulcrum shaft 77. An opening-closing roller 80 is rotatably installed at the upper end of the opening-closing lever 79 and is pressed inward at a predetermined timing by a pressing portion of an opening-closing member described later. A support shaft 81 is horizontally fixed at a position slightly below the opening-closing roller 80, pressing rollers 82 are rotatably attached to both ends of the support shaft 81, and the pressing rollers 82 abut on operation members 83 on the outer circumferences of the sliding cylinders 46, respectively. When the opening-closing roller 80 is pressed inward, the pressing rollers 82 pushes the operation members 83 inward, and the gripping members 43 and 44 open against the urging force of the compression springs 47. While the opening-closing lever 79 is urged by the compression springs 47 in a direction such that the opening-closing lever 79 is tilted outward, an abutting portion 84 provided on the lower end of the opening-closing lever 79 abuts on a stopper pin 85 installed on the mounting portion 60 of the holder so as to extend in a downward direction, so that the opening-closing lever 79 does not fall any further.

Figure 14:
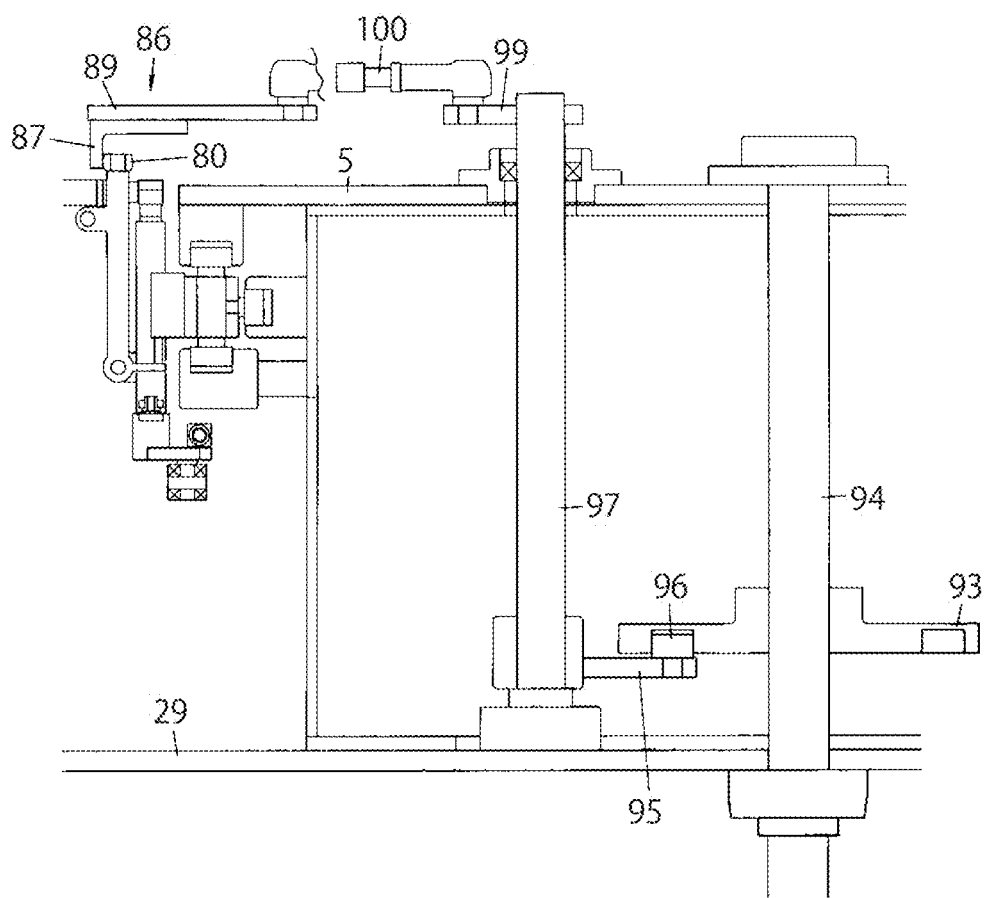
FIG. 14 is a side sectional view of an opening-closing mechanism unit for the gripping members of a gripper pair.
Figure 15:
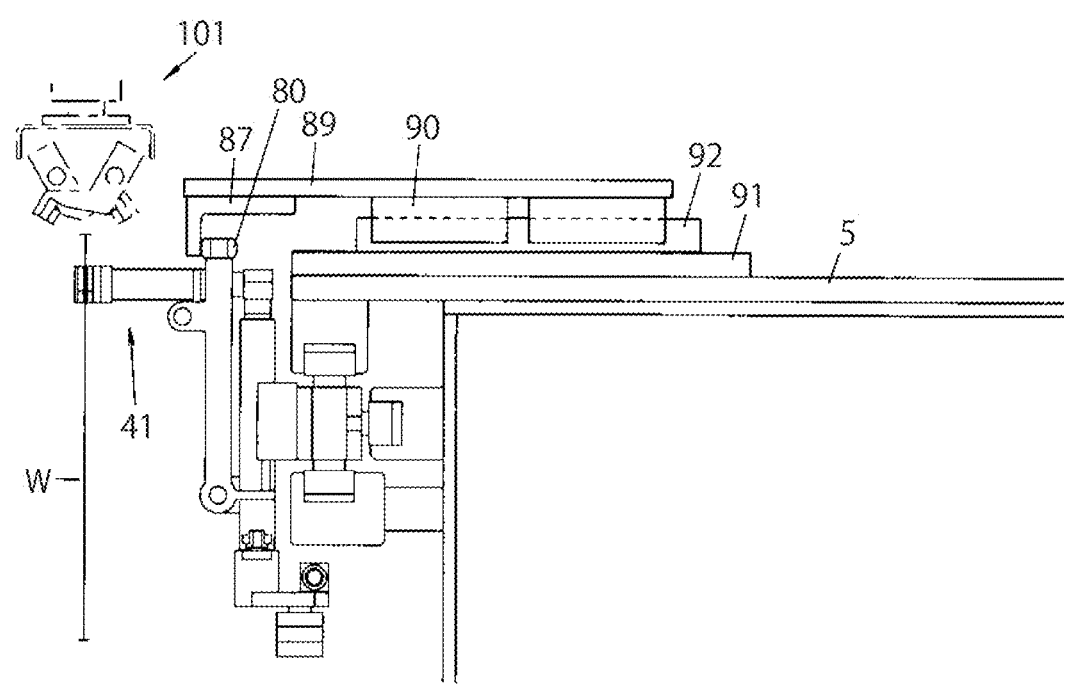
FIG. 15 is a side sectional view of another position of an opening-closing mechanism unit for the gripping members of a gripper pair.
Figure 16:
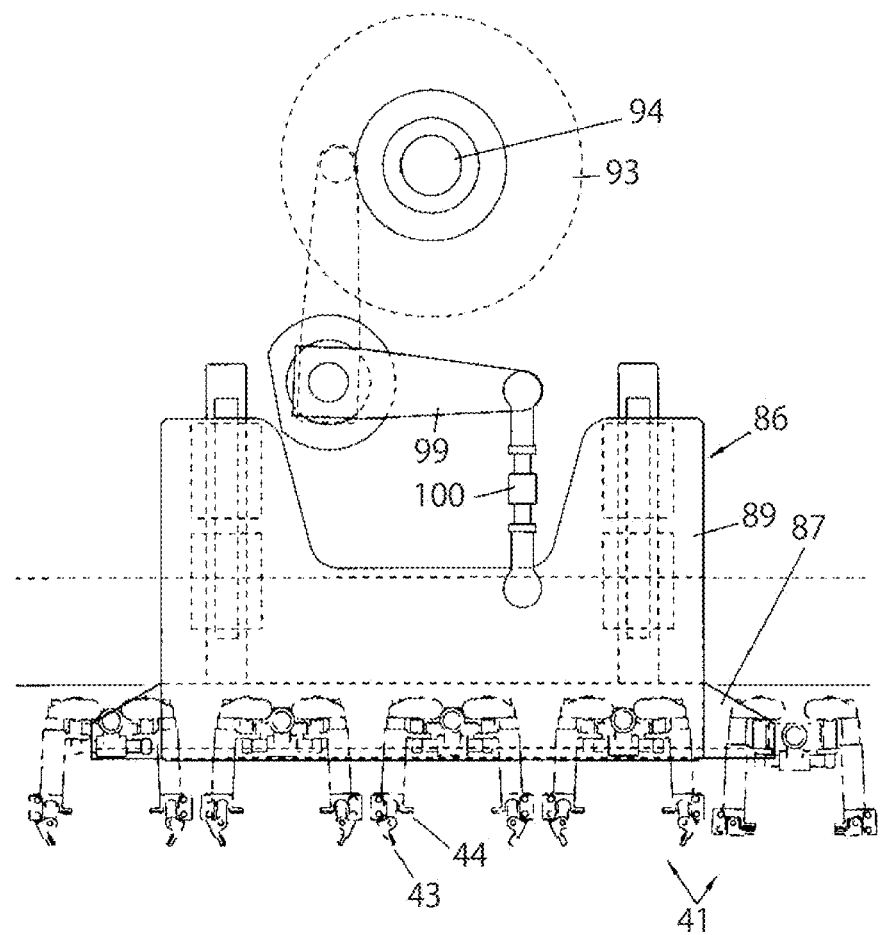
FIG. 16 is a plan view of an opening-closing mechanism unit for the gripping members of a gripper pair.

Next, the opening-closing operation of the gripping members 43 and 44 will be described. As shown in FIGS. 14 to 16, an opening-closing member 86 for operating the opening-closing roller 80 is installed on the sub-machine base 5 in a bag feeding process section of this bag packaging machine. The opening-closing member 86 includes: a pressing member 87 that presses the opening-closing roller 80; and an opening-closing plate 89 to which the pressing member 87 is attached. A slide member 90 is fixed to the lower surface of the opening-closing plate 89. The slide member 90 is provided so as to be able to freely slide along a slide rail 92 fixed on a mounting plate 91 provided on the upper surface of the sub machine base 5. A cam drive shaft 94 is erected on the machine base 29, a cam 93 is attached to the cam drive shaft 94, and a cam roller 96 provided at the tip of a lever 95 is fitted into a cam groove of the cam 93. The lever 95 is fixed near the lower end of a fulcrum shaft 97 rotatably erected on the machine base 29. A lever 99 is fixed to the upper end of the fulcrum shaft 97 protruding on the sub machine base 5. The lever 99 is connected to the opening-closing plate 89 via a connecting rod 100.

The cam drive shaft 94 rotates and the opening-closing plate 89 reciprocates at a predetermined timing. In accordance with timing when a plurality of (in this case, four) bag feeding transfer devices 101 approach gripper pairs 41 while gripping the upper edges of bags W respectively, the pressing member 87 moves inward to press opening-closing rollers 80 in such a manner that the gripping members 43 and 44 of a plurality of (in this case, four) gripper pairs 41 open at the same time. Subsequently, while the bag feeding transfer devices 101 move in synchronization with the transfer of gripper pairs 41, the pressing member 87 moves outward, the gripping members 43 and 44 close to grip the bags W, and the grippers of the bag feeding transfer devices 101 release the bags W and go away from the vicinity of the gripper pairs 41. In this way, the bag supply is performed. Also in the discharge process section of this bag packaging machine, devices similar to the opening-closing member 86 and the drive mechanism for the opening-closing member 86 are installed, and the gripping members 43 and 44 of a gripper pair 41 are opened in such a manner that a filled bag is dropped and ejected.

Figure 17:
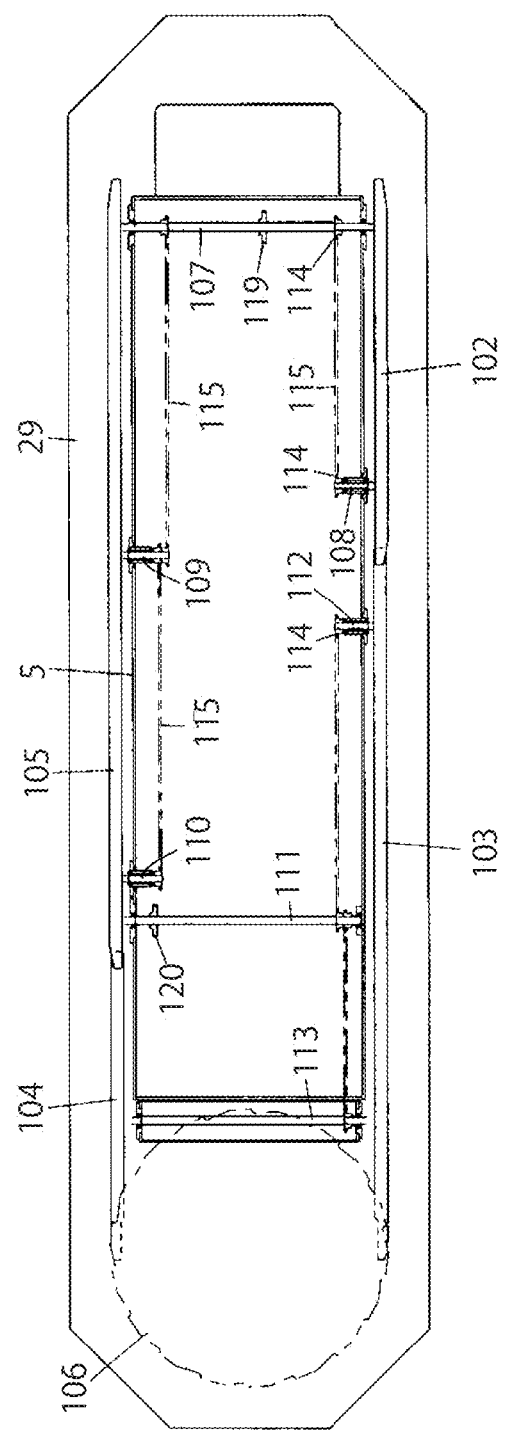
FIG. 17 is a plane section view of an arm opening-closing and arm space adjustment mechanism unit for a gripper pair.
Figure 18:
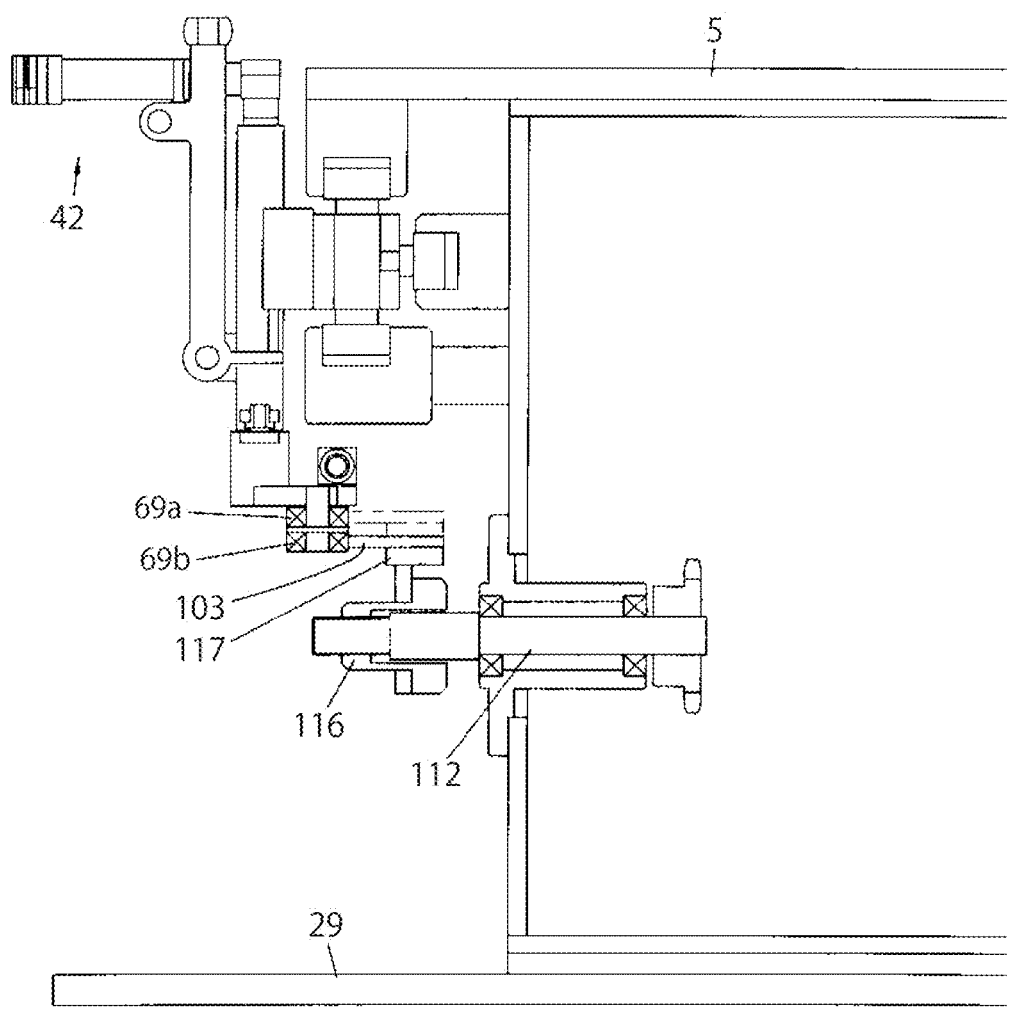
FIG. 18 is a side sectional view in a straight line part.

Subsequently, the opening-closing operation of arms 42, 42 will be described. As shown in FIGS. 17 to 18, four interval adjustment cams 102 to 105 on which a cam roller 69 abuts to adjust the interval between the arms 42, 42 (i.e., to open and close the arms 42, 42) so as to correspond to the respective packaging processing steps are arranged along straight tracks. At the place where the sprocket 1 is provided, an interval adjustment cam 106 which rotates along with the sprocket 1 is arranged. The interval adjustment cam 102 is located in the bag feeding process section. The interval adjustment cam 103 is located in the bag mouth opening and the solid material injection process section, and the interval between the arms 42 and 42 is narrowed in the bag mouth opening and the solid material injection process section. The interval adjustment cam 106 is located in the liquid material filling process section, and the interval adjustment cam 104 is located in the steam blowing process section. The subsequent interval adjustment cam 105 is located in the seal and discharge process section, and the interval between the arms 42 and 42 is widened again in the seal and discharge process section. The heights of the interval adjustment cams 102 to 106 are set in such a manner that the interval adjustment cams 102, 106, 105 abut on the upper roller 69a of a cam roller 69 and the interval adjustment cams 103, 104 abut on the lower roller 69b.

Each of the interval adjustment cams 102 to 105 is provided to be able to adjust the interval between the arms 42, 42 in accordance with the size of a bag while making the arms 42, 42 perform an open-close action. The adjustment mechanism of the interval adjustment cams 102, 105 includes: an adjustment drive shaft 107 which is pivotally supported on the side surfaces of the sub machine base 5; and adjustment shafts 108-110 which are pivotally supported on side surfaces of the sub machine base 5 and are connected to the adjustment drive shaft 107 by means of sprockets 114 and chains 115. Similarly, the adjustment mechanism of the interval adjustment cams 103 and 104 includes: an adjustment drive shaft 111; and adjustment shafts 112 and 113 which are connected to the adjustment drive shaft 111 by sprockets 114 and chains 115. Male threads are formed at the tips of the adjustment drive shafts and the adjustment shafts 107 to 113, nut members 116 are engaged with these male threads, and the interval adjustment cams 102 to 105 are attached to the nut members 116 via brackets 117 (see FIG. 18). Accordingly, when gears 119 and 120 are driven and rotated by a servomotor or the like (not shown), each of the adjustment drive shafts and the adjustment shafts 107 to 113 is rotated and each of the interval adjustment cams 102 to 105 is translated in a parallel manner. As a result, the positions of the arms 42, 42 are adjusted to positions such that the interval between the arms 42, 42 corresponds to the bag size.

Figure 19:
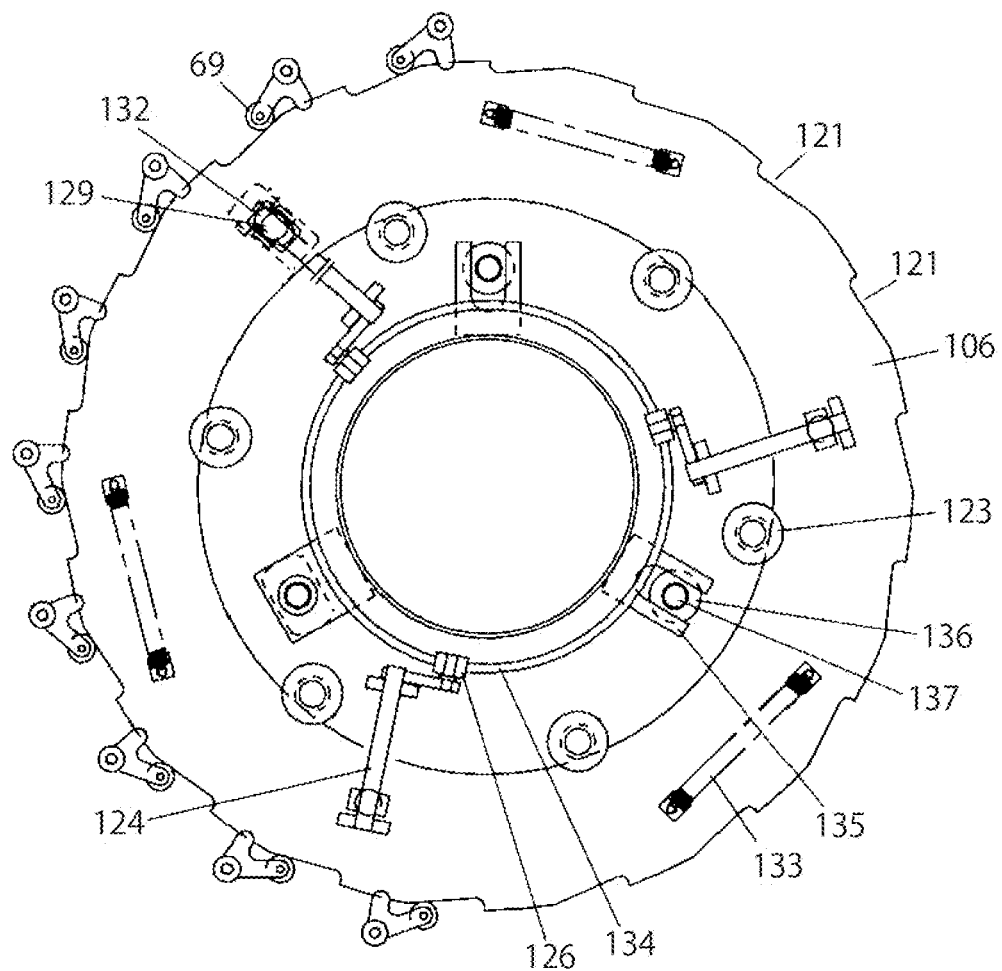
FIG. 19 is a plane section view of a sprocket unit.

Further, the interval adjustment cam 106 can also adjust the interval between the arms 42 and 42 according to the bag size. Specifically, as shown in FIG. 19, inclined cam contact surfaces 121 corresponding to the respective cam rollers 69 (69a) are formed in the outer circumstance of the interval adjustment cam 106, and the relative rotation between the interval adjustment cam 106 and the sprocket mounting plate 28 (and eventually the sprocket 1) can be performed. Accordingly, when the interval adjustment cam 106 is rotated with respect to the sprocket 1, the position of a cam roller 69 (69a) that abuts on a cam contact surface 121 (the distance from the rotation center of the sprocket 1) changes to adjust the interval between the arms 42 and 42.

Figure 20:
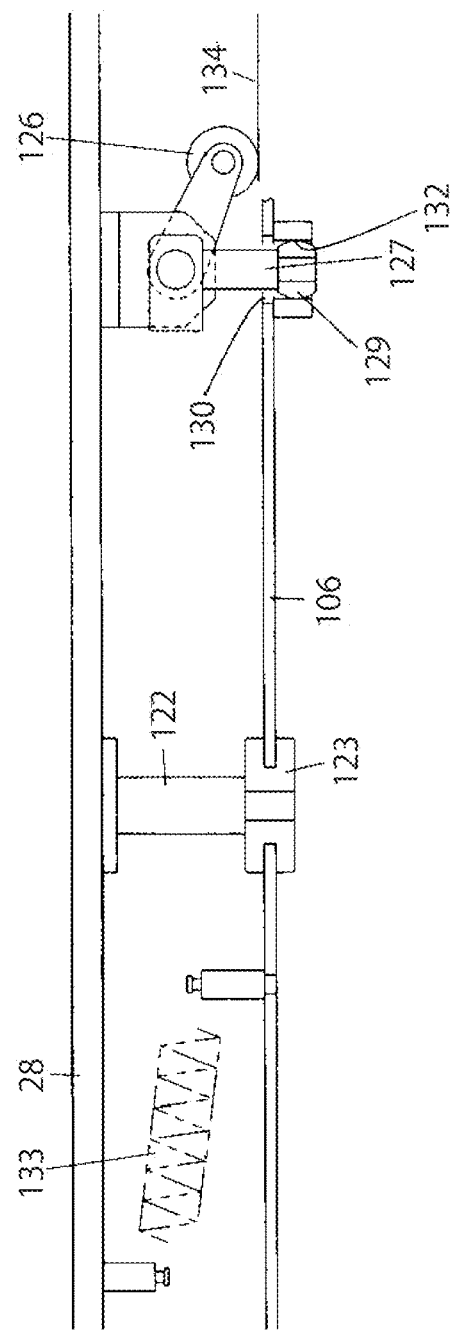
FIG. 20 is a partial side sectional view of a sprocket unit.

Further, with reference to FIGS. 6 and 20, the adjustment mechanism relating to the interval adjustment cam 106 will be specifically described. The interval adjustment cam 106 is an annular member. The inner peripheral side of the interval adjustment cam 106 can engage with the outer peripheral groove of the holder 123 and rotate relative to the sprocket mounting plate 28. The holder 123 is attached to the lower end of support stands 122 installed at equal intervals on the lower portion of the sprocket mounting plate 28. An adjusting shaft 124 is pivotally supported at the bottom of the sprocket mounting plate 28 so as to freely rotate. A cam roller 126 is attached to the inner end of the adjusting shaft 124 via a lever 125, and a roller 129 is attached to the vicinity of the outer end of the adjusting shaft 124 via a lever 127. The lever 127 passes through a hole 130 formed in the interval adjustment cam 106, and the roller 129 is fitted into an elongated hole 132 of a contact member 131 attached to the lower surface of the interval adjustment cam 106. Further, a tension spring 133 is installed between the sprocket mounting plate 28 and the interval adjustment cam 106 via spring hooks. The tension spring 133 applies a rotational force to the interval adjustment cam 106, so that the cam roller 126 is always in contact with the upper surface of a cylindrical cam 134.

The cylindrical cam 134 is fixed to support members 135 arranged in an appropriate number (in this example, three) around the stand 34. Each of the support members 135 is fixed to the nut member 136. On the machine base 29 around the stand 34, the same number of rotation shafts 137 as the support members 135 (that is, the same number of rotation shafts 137 as the nut members 136) are pivotally supported so as to freely rotate, and the male screws formed at the tips of the rotation shafts 137 are engaged with the nut members 136. A small diameter gear 139 is fixed to the lower end of each rotation shaft 137. These small diameter gears 139 mesh with a common large diameter gear 140 rotatably held around the stand 34. Further, in one rotation shaft 137, a pulley 141 is fixed under a small diameter gear 139. Accordingly, when the pulley 141 is rotated by being driven by a servomotor or the like (not shown), all the rotation shafts 137 are rotated at the same time, and the height of the cylindrical cam 134 is changed while the cylindrical cam 134 maintains its horizontal posture. Along with this, the height of the cam roller 126 changes, the adjusting shaft 124 rotates, the roller 129 swings, the interval adjustment cam 106 rotates, and its relative position with respect to the sprocket 1 changes. As a result, the position of the cam roller 69 (69a) (the distance from the rotation center of the sprocket 1) changes, and the interval between the arms 42, 42 is adjusted.

As shown in FIG. 6, a plurality of liquid material filling nozzles 142 are arranged on the upper portion of the sprocket 1 along the transfer track t of a bag W. The filling nozzles 142 are attached to an elevating member 143. The elevating member 143 performs a reciprocating rotation in which the elevating member 143 rotates in the same direction as the sprocket 1 by a predetermined angle so as to follow the sprocket 1, descends and ascends in the rotation process, and subsequently returns to the original position. When the elevating member 143 descends, a filling nozzle 142 is inserted into the opened bag mouth of a bag W and the liquid material is filled in the bag W. The elevating and rotating mechanism of the elevating member 143 includes: a support member 144 that supports the elevating member 143 in such a manner that the elevating member 143 is able to freely move up and down; a first hollow shaft 145 that reciprocates by a predetermined angle at a predetermined timing; a cylindrical cam 146 fixed onto the sprocket mounting plate 28; an arc-shaped cam 147 fixed to the first hollow shaft 145; a cam roller 149 travelling along these cams; a lever 150 which reciprocates the support member 144; and a rotation cylinder 151 which supports the lever 150 in such a manner that the lever 150 is able to freely rotate around the first hollow shaft 145, and description of these components are omitted.

Figure 21:
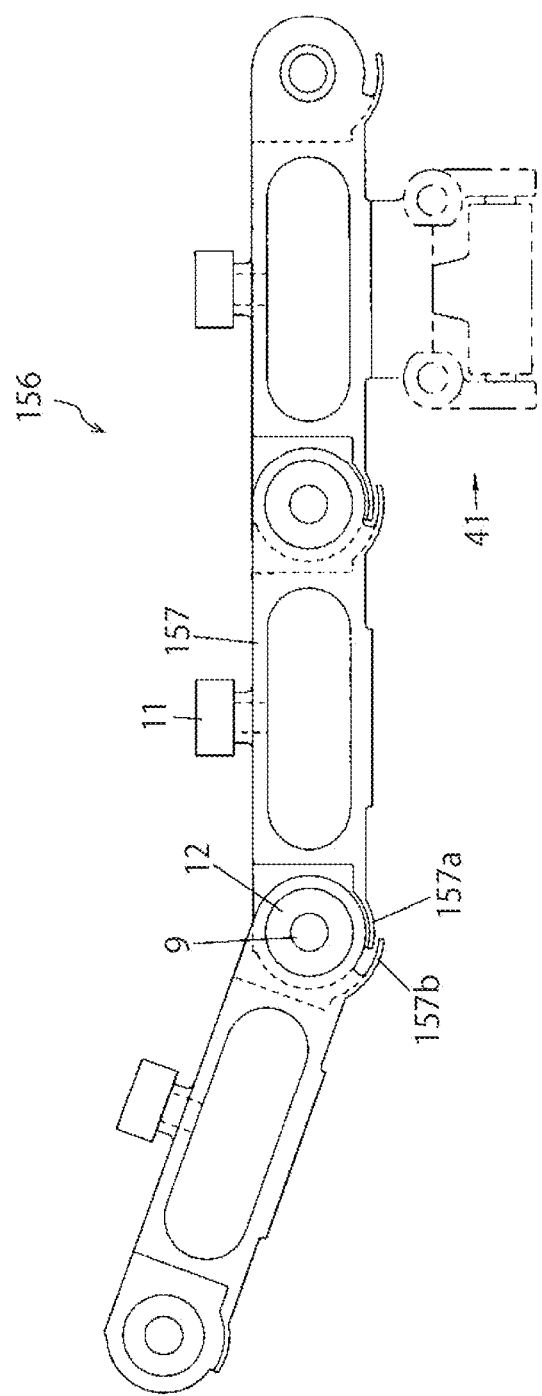
FIG. 21 is a plan view of another endless chain.
Figure 22:
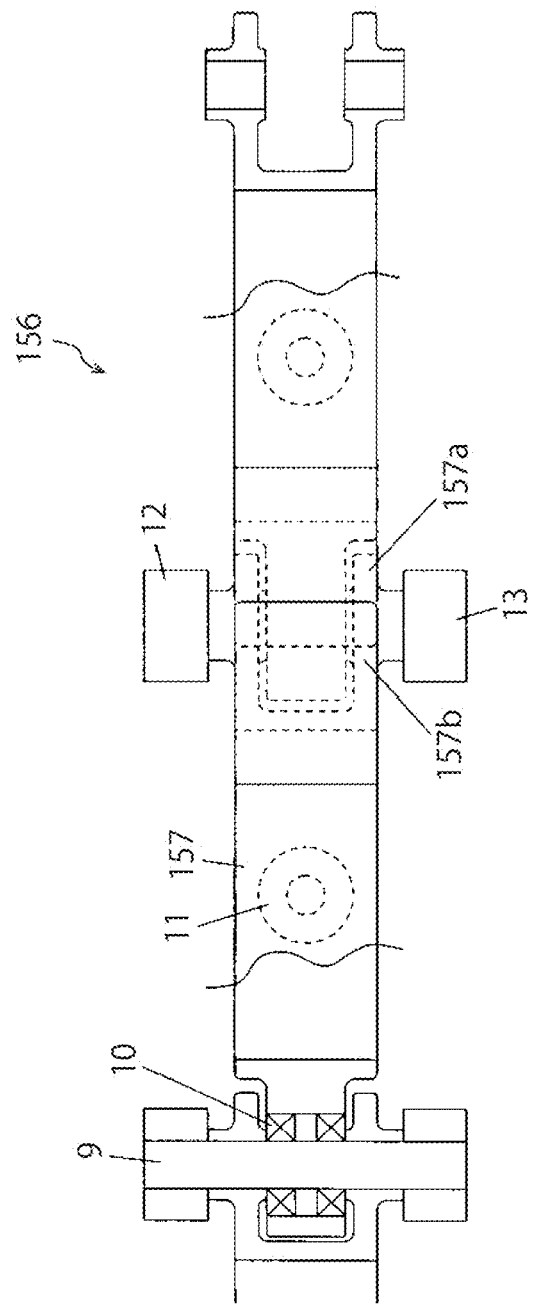
FIG. 22 is a front view (a partial cross section) of another endless chain.

Further, FIG. 21 and FIG. 22 show another endless chain 156. The endless chain 156 is different from the above-mentioned endless chain 6 in that extension portions 157*a* and 157*b* which have an arc shape in a plan view and which cover connecting portions are integrally formed on the left side surface and right side surface on the outer peripheral side of each link 157. One extension portion 157*a* has a smaller diameter than the other extension portion 157*b* and enters the inside of the extension portion 157*b* in a nested manner. As a result, even if the endless chain 156 bends in an arc shape on the sprocket 1 or the guide unit 2, the outer surface of connecting portions is not exposed, and dust or the like can be prevented from entering the connecting portions from the outside.

[Gripper Pair]

As described above, the bag transfer apparatus 500 of the present embodiment comprises a plurality of gripper pairs 41 (including the first gripper pair 41*a* and the second gripper pair 41*b* (see FIG. 11) described above) provided so as to be adjacent to each other in the horizontal direction. These gripper pairs 41 are moved along the horizontally extending endless track by power transmitted via a drive source (not shown) acting as a drive device, the gear 36, the sprocket 1, and the endless chain 6. Each gripper pair 41 has a left support unit 201 that supports one side portion (i.e., the left side portion) of a bag W and a right support unit 202 that supports the other side portion (i.e., the right side portion) of the bag W. As shown in FIG. 11, the whole of one of "the right support unit 202 of one gripper pair 41 (i.e., the first gripper pair 41*a*) located relatively to the left" of gripper pairs 41 provided adjacent to each other and "the left support portion 201 of the other pair 41 (i.e., the second gripper pair 41*b*) located to the right" is positioned above the whole of the other.

In the example shown in drawings, in each of all gripper pairs 41 including the first gripper pair 41*a* and the second gripper pair 41*b*, one (i.e., the left support unit 201) of the left support unit 201 and the right support unit 202 is positioned above the whole of the other (i.e., the right support unit 202). The height direction position of each gripper pair 41 may be determined based on, for example, a horizontally movable portion included in each gripper pair 41, and in the example shown in drawings, may be determined based on the gripping members 43, the gripping members 44, and the arms 42.

According to the bag transfer apparatus 500 having the above-described configuration, it is possible to transfer bags W having various shapes while appropriately supporting them, and for example, even a bag W having an asymmetric planar shape can be transferred while being appropriately supported.

In general, there are many cases in which a process for each bag W (for example, a process of opening a mouth, a process of filling of contents, or a process of sealing a bag mouth, etc.) requires deformation of a part of the bag W near the bag mouth (usually, a part near the upper edge of the bag W). Therefore, from a viewpoint of transferring a bag W while appropriately supporting the bag W in such a manner that the bag mouth can be stably opened and closed, it is preferable to support a portion of the bag W close to the bag mouth that does not interfere with each process (for example, a portion near the bag mouth which does not include a planned seal portion) by using a gripper pair 41. However, in a case where one of both side portions (in particular, portions near the bag mouth) of a bag W has a special shape like the bag shown in FIG. 2(*c*) of Japanese patent application publication No. 2011-240962, it is difficult for conventional bag transfer apparatuses to support both sides of a bag W (in particular, portions near the bag mouth) at the same height position in the same way.

On the other hand, as in the bag transfer apparatus 500 of the present embodiment, by differentiating the height position of the left support unit 201 from the height position of the right support unit 202 of each gripper pair 41, it is possible to flexibly deal with various shapes of both side portions of a bag W. For example, even in a case where the left side portion has a side edge portion extending linearly in the height direction but the side edge portion of the right side portion (in particular, a portion near the bag mouth of the upper edge of a bag W) has a complicated shape, according to the bag transfer apparatus 500 of the present embodiment, the right side portion of a bag W (for example, a portion having an edge part extending linearly in the height direction) can be supported by the right support unit 202 of each gripper pair 41 while the left side portion of the bag W (in particular, a portion in the vicinity of the bag mouth) can be supported by the left support unit 201.

Further, the right support unit 202 of one gripper pair 41 (i.e., the first gripper pair 41*a*) of gripper pairs 41 provided adjacent to each other and the left support unit 201 of the other gripper pair 41 (i.e., the second gripper pair 41*b*) may be provided so as to partially overlap each other in the height direction. Specifically, it is possible to effectively utilize the horizontal space by arranging the left support unit 201 and the right support unit 202 in such a manner that the projection with respect to the height direction of the right support unit 202 of one gripper pair 41 (i.e., the first gripper pair 41*a*) and the projection with respect to the height direction of the left support unit 201 of the other gripper pair 41 (i.e., the second gripper pair 41*b*) overlap each other.

In one variant example of gripper pairs (that is, the first gripper pair 41*a* and the second gripper pair 41*b*) shown in FIG. 23, the whole of a left support unit 201 gripping the left side portion WI of each bag W is provided at a position higher than the whole of a right support unit 202 gripping the right side portion Wr. In the example shown in FIG. 23, the left support units 201 of the gripper pairs are provided at the same height position as each other, and the right support units 202 of the gripper pairs are also provided at the same height position as each other. In a bag W shown in FIG. 23 as an example, a bag mouth that can be opened and closed is formed at the top portion Wt, and a folded portion is formed at the bottom portion Wb. By expanding the folded portion of the bottom portion Wb, the volume of the bag W can be expanded and the bag W can be placed in a self-supporting state.

For example, in a case where the height positions of the left support unit 201 and the right support unit 202 of adjacent gripper pairs 41 are the same as each other, these gripper pairs 41 are required to be installed apart from each other in the horizontal direction and thus the horizontal space are not used effectively. In this case, the size of the bag transfer apparatus 500 in the horizontal direction may be increased. Further, in order to reduce the horizontal size of such a bag transfer apparatus 500, it is necessary to reduce the number of gripper pairs 41.

In contrast, in a case where the right support unit 202 (of the first gripper pair 41*a*) and the left support unit 201 (of the second gripper pair 41b) of gripper pairs 41 adjacent to each other partially overlap each other in the height direction, the size of the horizontal space required for the installation of the gripper pairs 41 does not necessarily depend on the size of the horizontal space required for the support portions 201, 202, and thus the horizontal space can be effectively utilized (see FIG. 23). This makes it possible, for example, to reduce the horizontal size of the bag transfer apparatus 500 and to increase the number of gripper pairs 41. In addition, by adjusting the distance between the support portions 201 and 202 of each gripper pair 41, it is possible to hold and transfer bags W of various widths without changing the size of the entire bag transfer apparatus 500 and it is also possible to make the maximum width of a bag W that can be handled larger than before.

The shift length in the height direction between the left support unit 201 and the right support unit 202 is not limited in particular. From a viewpoint of avoiding an unintended collision between the left support unit 201 and the right support unit 202, it is preferable to provide a sufficiently large height direction space between the left support unit 201 and the right support unit 202. On the other hand, from a viewpoint of realizing good symmetry of the behavior of a bag W when the bag W is opened and closed by each gripper pair 41, the height direction position of the left support unit 201 is as close to the height direction position of the right support unit 202 as possible. Typically, if there is a distance in the height direction of about 0.3 cm to 5 cm between the left support unit 201 and the right support unit 202, it is possible to effectively avoid the unintended collision between the left support unit 201 and the right support unit 202 and it is often possible to realize good symmetry of the behavior of a bag W when the bag W is opened and closed by each gripper pair 41.

The above-mentioned advantages are particularly effective when the support mode of a bag W in the bag transfer apparatus 500 is "gripping a bag W". Specifically, in a case where the left support unit 201 of each gripper pair 41 pinches and supports one side portion of a bag W and the right support unit 202 pinches and supports the other side portion of the bag W, it is possible to effectively enjoy benefits brought about by "positioning one of the right support unit 202 of the first gripper pair 41a and the left support unit 201 of the second gripper pair 41b above the other.

For example, in a case where a bag W is held by vacuum sucking a side surface of the bag W, the degree of freedom in the installation position of the vacuum suction device (the holding unit) is relatively large, and it is possible to hold the bag W with the vacuum suction device in a state where the vacuum suction device does not protruding in the horizontal direction from the side edge portion of the bag W or in a state where the amount of protrusion of the vacuum suction device is small. In such a case, even if the adjacent holding units are installed at the same height position, it may be possible to bring the holding units sufficiently close to each other in the horizontal direction. On the other hand, in a case where a bag W is held by pinching the side portions of the bag W, the pinching bodies (i.e., the grippers (for example, the arms 42, the gripping members 43 and the gripping members 44)) extending in the horizontal direction often protrude in the horizontal direction from the side edge portions of the bag W by a considerable amount. In such a case, by using the bag transfer apparatus 500 of the present embodiment described above, it is possible to effectively support a bag W having various lateral shapes in an appropriate manner and to reduce the influence of the horizontal size of the pinching bodies on the horizontal space for the entire apparatus.

The present disclosure is not limited to the above-described embodiments and variant examples. For example, various modifications may be added to each element of the above-described embodiments and variant examples. Further, the configurations of the above-described embodiments and variant examples may be combined in whole or in part.

The invention claimed is:

1. A bag transfer apparatus comprising a plurality of holding units which include a first holding unit and a second holding unit provided to be adjacent to each other in a horizontal direction and are provided to be able to move,
    wherein each of the plurality of holding units includes: a left support unit which supports one side portion of a bag; and a right support unit which supports another side portion of the bag, and
    wherein one of the right support unit of the first holding unit and the left support unit of the second holding unit is positioned above the other; and
    wherein in each of the first holding unit and the second holding unit, one of the left support unit and the right support unit is positioned above the other.

2. The bag transfer apparatus as defined in claim 1, wherein whole of the one of the right support unit of the first holding unit and the left support unit of the second holding unit is positioned above whole of the other.

3. The bag transfer apparatus as defined in claim 2, wherein the right support unit of the first holding unit and the left support unit of the second holding unit overlap each other in a height direction.

4. The bag transfer apparatus as defined in claim 3, wherein the left support unit pinches the one side portion of the bag to support the one side portion and the right support unit pinches the another side portion of the bag to support the another side portion.

5. The bag transfer apparatus as defined in claim 2, wherein the left support unit pinches the one side portion of the bag to support the one side portion and the right support unit pinches the another side portion of the bag to support the another side portion.

6. The bag transfer apparatus as defined in claim 1, wherein the right support unit of the first holding unit and the left support unit of the second holding unit overlap each other in a height direction.

7. The bag transfer apparatus as defined in claim 6, wherein the left support unit pinches the one side portion of the bag to support the one side portion and the right support unit pinches the another side portion of the bag to support the another side portion.

8. The bag transfer apparatus as defined in claim 1, wherein the left support unit pinches the one side portion of the bag to support the one side portion and the right support unit pinches the another side portion of the bag to support the another side portion.

* * * * *

UNITED STATES PATENT AND TRADEMARK OFFICE
CERTIFICATE OF CORRECTION

| | | |
|---|---|---|
| PATENT NO. | : 11,465,853 B2 | Page 1 of 1 |
| APPLICATION NO. | : 17/233092 | |
| DATED | : October 11, 2022 | |
| INVENTOR(S) | : Nakamoto et al. | |

It is certified that error appears in the above-identified patent and that said Letters Patent is hereby corrected as shown below:

On the Title Page

Please replace the currently named Assignee, with the following updated name below:
PACRAFT CO., LTD.

Signed and Sealed this
Twenty-eighth Day of February, 2023

Katherine Kelly Vidal
*Director of the United States Patent and Trademark Office*